(12) United States Patent
Finnegan

(10) Patent No.: US 7,506,170 B2
(45) Date of Patent: Mar. 17, 2009

(54) METHOD FOR SECURE ACCESS TO MULTIPLE SECURE NETWORKS

(75) Inventor: Sean Robert Finnegan, Leesburg, VA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 10/857,431

(22) Filed: May 28, 2004

(65) Prior Publication Data

US 2005/0268336 A1    Dec. 1, 2005

(51) Int. Cl.
*G06F 9/00* (2006.01)
(52) U.S. Cl. .................. 713/182; 713/162; 713/165; 713/166; 713/167
(58) Field of Classification Search .................. 713/182, 713/162, 165, 166, 167
See application file for complete search history.

(56) References Cited

U.S. PATENT DOCUMENTS

| 4,974,159 A | 11/1990 | Hargrove et al. |
| 5,761,477 A | 6/1998 | Wahbe et al. |
| 6,151,618 A | 11/2000 | Wahbe et al. |
| 2003/0065676 A1 | 4/2003 | Gbadegesin et al. |

OTHER PUBLICATIONS

Coopee, T., *VMware eases multiple OS overload*, InfoWorld Test Center, pp. 1-4 (Jan. 12, 2001).

Meushaw R. et al., *NetTop:Commercial Technology in High Assurance Applications*, Research & Advanced Technology Publication, vol. 9, Edition 4 pp. 1-8 (2000).
Tse-Huong, C., *Vaulted VPN: Compartmented Virtual Private Networks On Trusted Operating Systems*, Proceedings of the 8th USENIX Security Symposium, pp. 1-12, The USENIX Association, (1999).
Faden, G., *Maintaining Network Separations with Trusted Solaris™ 8 Software*, Sun Microsystems, Inc. pp. 1-16 (2001).
Fraser, T. et al., *Linux Security Systems and Tools*, Linux Security Systems and Tools, pp. 1-10 (2001).
Sun Microsystems-Reality Check, *Reality Check: Security for Your Information Assets: Part III—The Trusted Solaris Advantage*. Sun Microsystems, Inc. pp. 1-5 (Dec. 2003).
Vizard, M., *VMware helps IT control system costs*, InfoWorld, pp. 1-4 (Jul. 19, 2002).
IBM @server zSeries, Securing Your Business with the IBM @server zSeries, pp. 1-10, IBM Corporation (Apr. 2004).

*Primary Examiner*—Thomas Peeso
(74) *Attorney, Agent, or Firm*—Woodcock Washburn LLP

(57) ABSTRACT

Disclosed is a method for providing secure access to multiple secure networks from a single workstation. The architecture can use multiple layers of protection to isolate applications running at different security levels. The first means of isolation is a virtual machine monitor that isolates multiple operating systems running within separate virtual machines on the host operating system. The second layer is the use of multiple user security contexts on the host operating system to isolate each virtual machine. The third level of protection is a highly secured and restricted host operating system where all unnecessary services are removed and user actions are restricted to just the virtual machine monitor using software restriction policies. Finally, the operating system and virtual machine monitor can be run from read-only media to prevent any changes by an attacker from persisting.

36 Claims, 5 Drawing Sheets

METHOD FOR SECURE ACCESS TO MULTIPLE SECURE NETWORKS

TECHNICAL FIELD

The present invention relates generally to the implementation of a multi-level security architecture and, more particularly, to methods for providing secure access to multiple secure networks by using a discretionary access control model to implement a mandatory access control model.

BACKGROUND OF THE INVENTION

In a typical enterprise network installation user access can be managed to three or more separate networks. For example, an intranet can be used to refer to the entity's internal network typically only accessible to employees or contractors with employee-like access. Enterprise installations can also provide user access to the Internet to allow for research and exchange of information with other users around the world. Finally, an enterprise installation can have one or more extranets where the entity and its business partners can share information in a more secure setting. Typically, a subset of the entity's mission systems or data can be exposed to its partners via this extranet. Each of these networks has varying levels of trust ranging from the intranet where employees and contractors are considered generally trustworthy, to the extranet where a lesser degree of trust exists, to the Internet where all users are explicitly not trusted.

For the typical enterprise, access between these different networks can be controlled through trusted hosts such as firewalls and application proxies. These trusted hosts need to be correctly configured and meticulously maintained to maintain the correct security boundaries between networks. Many enterprises have had success with the trusted host model because it allows the enterprise to focus its effort on securing a small number of network connections and if necessary also provides an easy mechanism to isolate a network under attack. However, while most government and commercial enterprises moved to connect these networks in the 1990's, certain governmental networks remain largely isolated. These so-called "air gapped" networks remain so because it was determined that access to them by unauthorized users could result in loss of life or grave damage to national security. Thus, users that required access to multiple networks were given multiple workstations. To the end-user this solution had its limitations as these disconnects were seen as an impediment to them effectively performing their job functions.

Over time both the number and importance of these networks has continued to grow to support information sharing for, among other things, the war on terror and coalition war fighting. The number of users that require access to multiple networks as well as the amount of time they must spend on each has grown dramatically. As a result there is a growing demand within the government, particularly within the intelligence and defense communities, to provide access to multiple networks through a reduced number of workstations. By reducing the number of workstations many advantages are realized, such as lower total lifecycle infrastructure costs and fewer required software licenses. Additionally, there is a desire to provide increased functionality and usability through multiple windows on a workstation, each representing a lens into a different network. Furthermore, there exists a vision to provide the ability to re-grade and disseminate data between these networks without requiring onerous processes or human review. Finally, many environmental benefits can also be achieved, including hardware footprint reduction, power reduction, and reduced ambient cooling demands. Each of these is especially critical in environments where physical space is limited such as in ships, submarines, and mobile tactical environments.

To date several solutions have attempted to address the problem of reducing the number of workstations needed to securely access multiple networks, however they have all suffered from the same shortcoming of being complicated to maintain and costly to build. In the 1960's the concept of virtual machines was first introduced by IBM. A virtual machine appears to be its own operating system running its own applications, but the virtual machine does not actually communicate with the hardware directly. Instead the virtual machine communicates to virtualized hardware and it is an underlying host operating system that actually handles the communication directly to the hardware. The introduction of the virtual machine gave rise to the use of a multi-level system virtual machine monitor to isolate virtual machines by security level, first prototyped in the 1970's by System Development Corp. In this solution multiple virtual machines are isolated from each other and a special purpose operating system underneath the virtual machines arbitrates between the virtual machines and deals with accessing the hardware directly. Later variants of this model, having a somewhat more manageable kernel structure and a number of specific innovations (i.e., handling of virtual input/output devices), were built on the VAX SVS system in the 1980's.

Another approach aimed at securely accessing multiple networks from a single machine is the concept of a mandatory access control model. Trusted Solaris is an example of this implementation whereby a user of the system is able to launch programs at different classifications or levels and the data associated with the programs is labeled with the clearance level that maps to that particular classification. Thus, instead of a user having access to all data, the operating system now has the ability to separate out the pieces of data that the user can access. For example, there might be top-secret, secret, and unclassified data levels and only certain applications or certain processes can access certain data. Basically the mandatory access control model endeavors to prevent rogue applications from running disguised as a trusted user and accessing certain types of application data. This concept however also proved difficult and complicated to implement and never achieved any success in the commercial operating system arena.

More recently, the National Security Agency (NSA) launched project NetTop, generically described as a system architecture designed to provide secure access to multiple security domains from a single machine by using virtual machine technology. In the NetTop architecture multiple virtual machines each run a standard commercial operating system on top of a host operating system, but rather than the host operating system being something like a mainframe operating system like VAX, it is actually a PC operating system with some additional security changes added to support a mandatory access control model. To date the NetTop systems have been based exclusively on the VMWare virtual machine monitor and have used Security Enhanced (SE) Linux as the host operating system. While the NetTop architecture may hold promise at solving the multi-security domain access issue, NetTop still presents challenges with respect to employing a host operating system which is neither easy nor cost-effective to support.

Accordingly, there exists a need for an architecture which allows for securely accessing multiple networks from a single workstation, that is easy to maintain and administer, and one on which it is not cost prohibitive to do so. Such an architecture would optimally provide for a mandatory access control model which could be implemented on widely used commercial operating systems out-of-the-box.

SUMMARY OF THE INVENTION

In view of the foregoing, the present invention provides a method for providing secure access to multiple secure networks from a single workstation by using a discretionary access control model to implement a mandatory access control model.

In one embodiment the method of the present invention comprises multiple virtual machines, each running a copy of a commercial desktop operating system and connected to a single network. These virtual machines in turn can run on a stripped down and hardened host operating system. The architecture can use multiple layers of protection to isolate applications running at different security levels.

The first and primary means of isolation is a virtual machine monitor that isolates multiple operating systems running within separate virtual machines on the host operating system. The second layer of defense is the use of multiple user security contexts on the host operating system to isolate each virtual machine not only as individual processes, but also as separate users on the host system. This allows the use of discretionary access control lists as well as file encryption to prevent the virtual machines at different levels from attacking each other while also obviating the need for a mandatory access control mechanism to provide separation. The third level of protection is a highly secured and restricted host operating system where all unnecessary services, including networking, are removed and user actions are restricted to just the virtual machine monitor using software restriction policies. Finally, the operating system and virtual machine monitor can be run from read-only media to prevent any changes by an attacker from persisting. Combined, these layers of defense form a robust system that provides a high degree of separation between networks on a single workstation.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
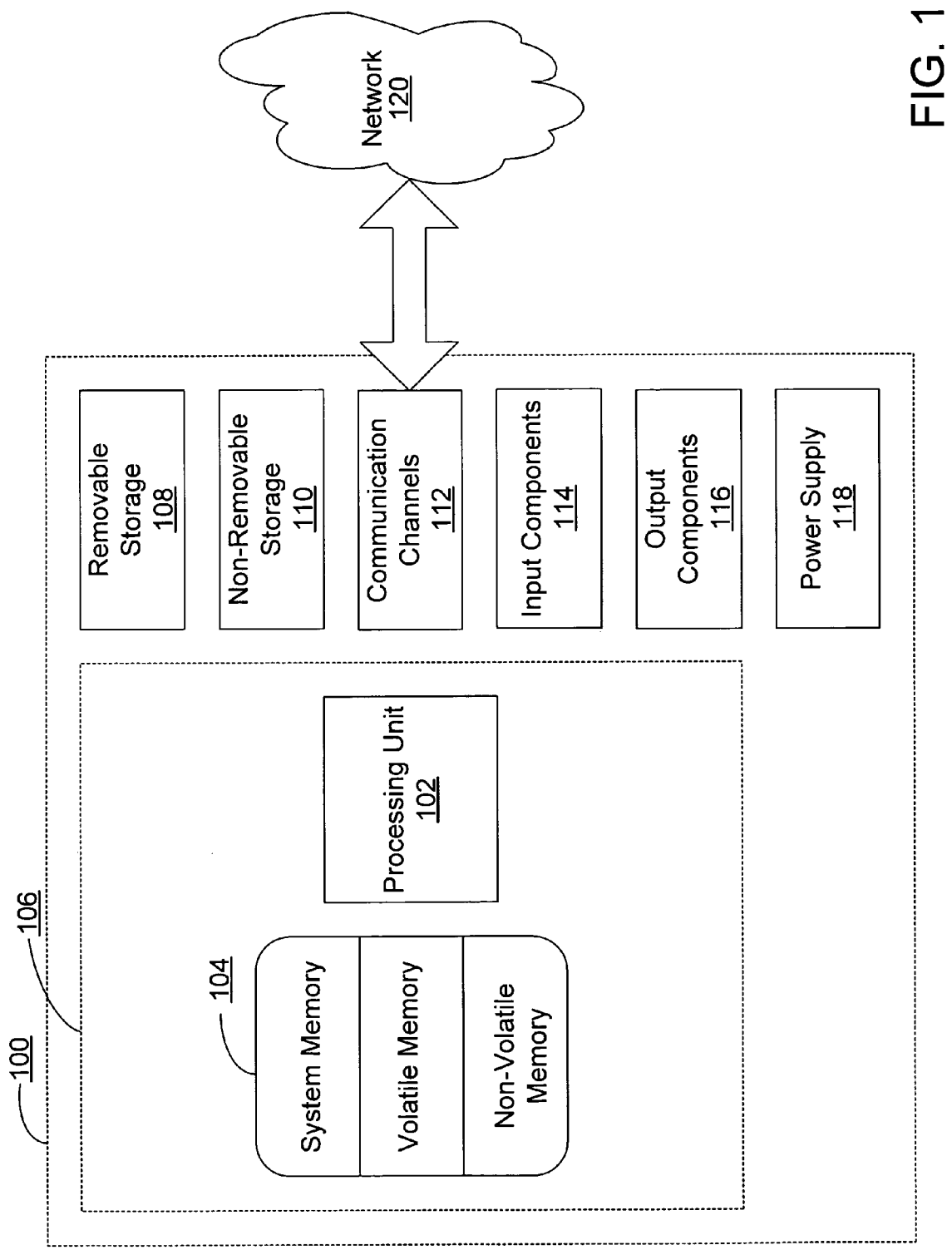
FIG. 1 is a schematic diagram of an exemplary computer architecture on which the method of the invention can be implemented.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable networking environment. The following description is based on illustrated embodiments of the invention and should not be taken as limiting the invention with regard to alternative embodiments that are not explicitly described herein.

I. Exemplary Environment

Referring to FIG. 1, the present invention relates to implementing an architecture for securely accessing multiple networks from a single workstation. The workstation can be a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Virtual Machines

Figure 2:
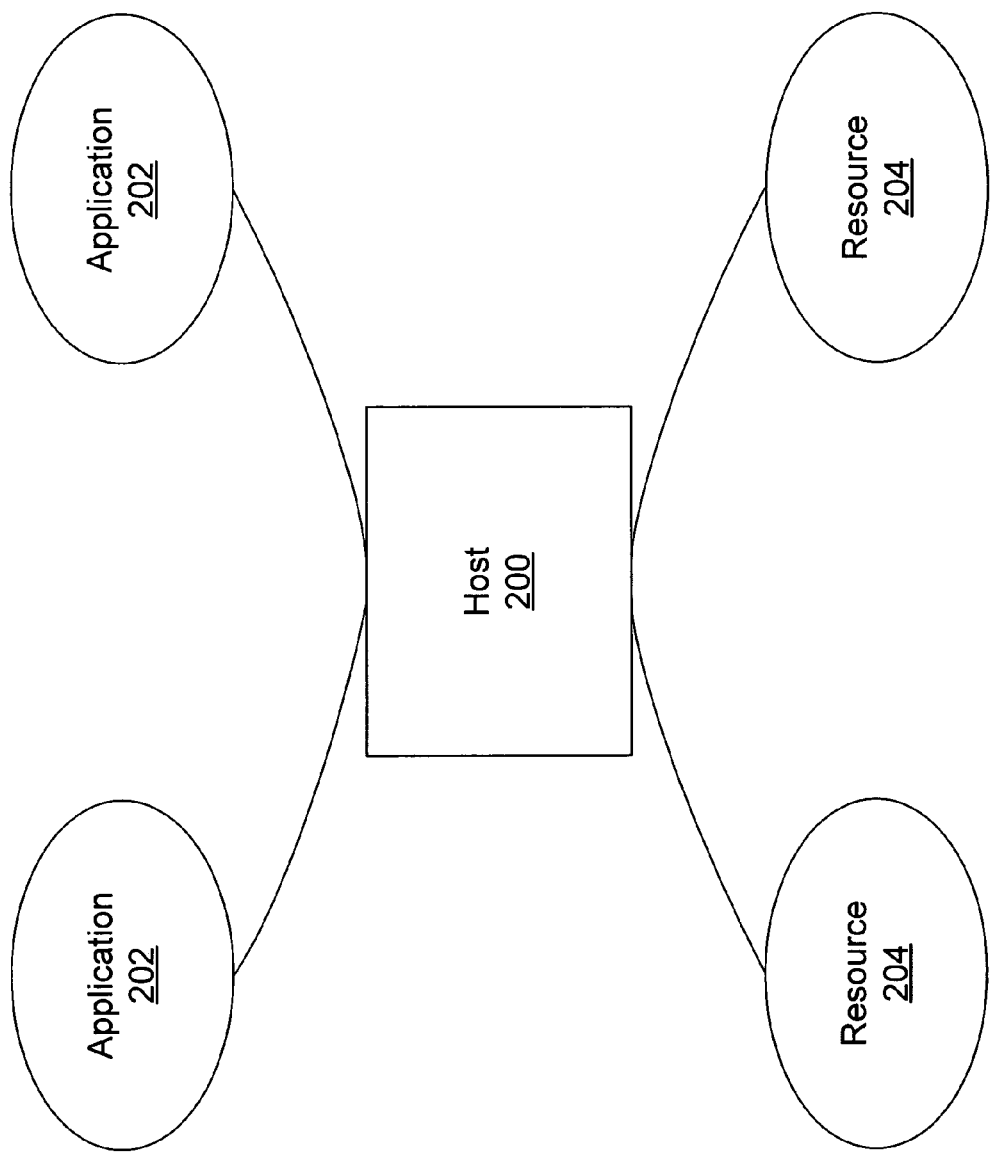
FIG. 2 is a schematic diagram showing an exemplary single level operating system architecture.

The present invention is directed to a method for providing secure access to multiple secure networks from a single workstation. Referring to FIG. 2, an exemplary single level operating system architecture is illustrated. Traditionally, the single level system will comprise a host operating system 200. The host operating system 200 will typically have a set of resources 204 which may include, among other things, a network connection 112 for browsing and connecting to networks, and disk drives 108, 110 for storing files. A workstation operator can be logged into the workstation as a user and can run applications 202, such as for example, a word processing application and a web browsing application. The single level system of FIG. 2, though, does not provide for the scenario where optimal security between applications is required. For example, if one application 202 is able to access data via a resource 204 so can another application 202 running within the context of the host operating system 200. A facility which prevents the applications 202 from accessing particular pieces of data is not implementable under this architecture. Such a limitation becomes especially problematic when a workstation is connected to multiple networks and these networks are separated on the basis of differing levels of data sensitivity.

Figure 3:
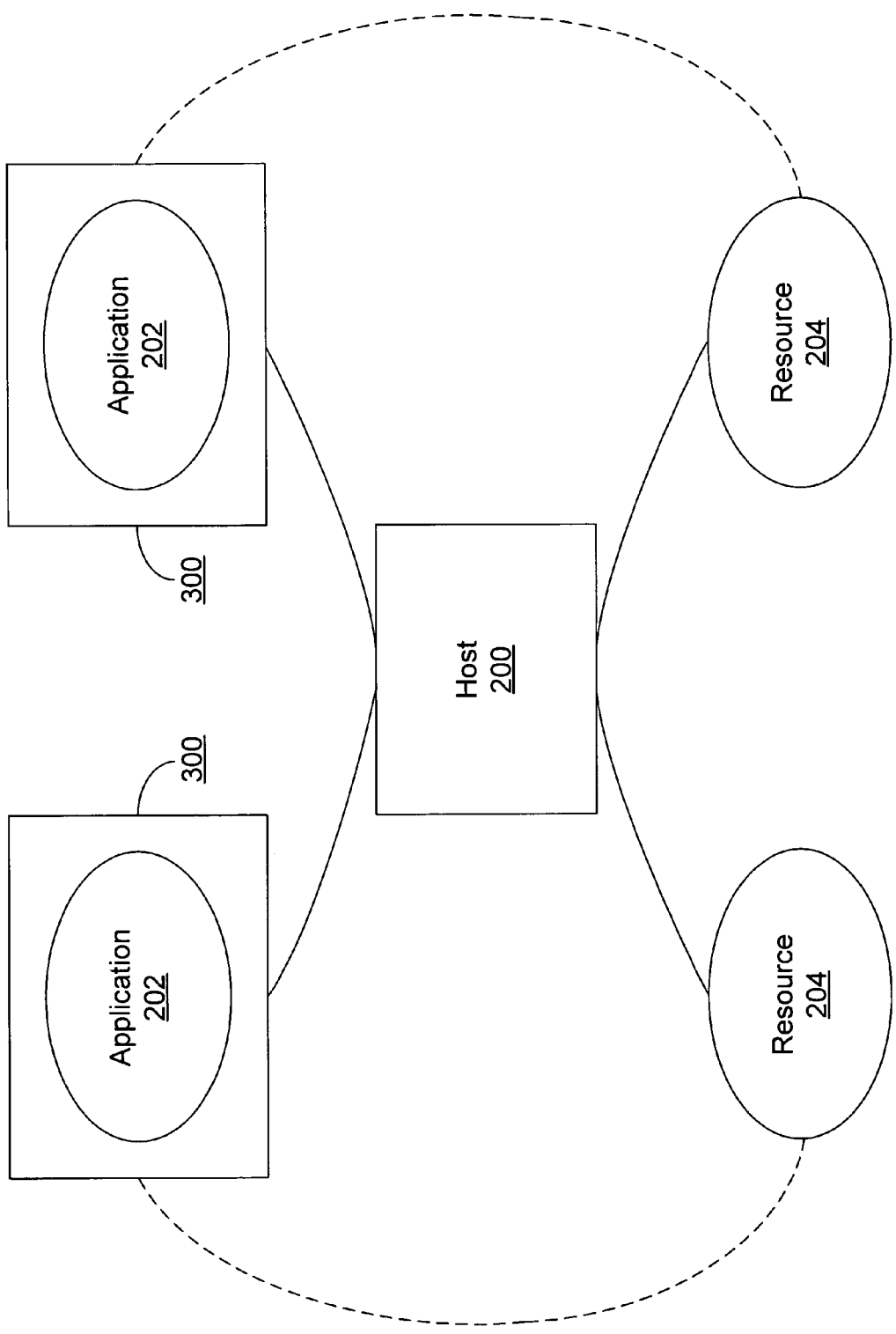
FIG. 3 is a schematic diagram showing an exemplary operating system architecture employing virtual machine technology to achieve separate processing.

In an effort to address the above situation, the concept of a virtual machine can be implemented. Turning to FIG. 3, an architecture employing virtual machine technology to achieve separate processing is illustrated. In this architecture the host operating system 200 can create virtual machines 300, which are separate instances of the operating system 200. Inside the virtual machine 300 instances of applications 202 can be run. While a virtual machine 300 appears to be its own operating system running its own applications 202, the virtual machine 300 does not actually communicate directly with hardware resources 204. Instead the virtual machine 300 communicates to virtualized hardware resources and it is the underlying host operating system 200 that handles the communication with the actual hardware resources 204. Because the virtual machines 300 are abstracted from the underlying hardware resources 204 they cannot themselves initiate communication with one another and thus it becomes possible for the host operating system 200, for example, to dictate that one virtual machine may communicate with one network but not another, or, to dictate that the virtual machines use separate virtual disks, for example, for separate hard drive environments. In the illustration of FIG. 3, for example, the virtual machines 300 could each be isolated from one another and the host operating system 200 underneath the virtual machines 300 could then arbitrate between them and deal with accessing the hardware resources 204 directly.

To implement and manage the virtual machines, virtual machine monitoring software can be used. In the method of the present invention a virtual machine configuration and virtual disk file can be created for each network that the workstation will be connecting to (e.g., a "top-secret" virtual machine and a "secret" virtual machine). Additionally, the virtual machine monitoring software can provide a bridged networking capability which can be used to bind each virtual machine's virtual network adaptor to the physical network adaptor on the host that is connected to the appropriate network.

III. Multiple User Security Contexts

While virtual machine technology provides a first level of isolation for processes running at different security levels on a single workstation, as will be appreciated by one of ordinary skill in the art, the applications running within the virtual machines are explicitly not trusted. In the event that a flaw is found in the virtual machine monitoring software it is important that the architecture provide a way to isolate a rogue application that has escaped the isolation of the virtual machine and prevent it from accessing or modifying information in other virtual machines.

A secondary level of isolation can be achieved through the use of multiple user security contexts on the host operating system to isolate each virtual machine not only as individual processes, but also as separate users on the host system. Such an arrangement allows for the use of discretionary access control lists as well as file encryption to prevent the virtual machines at different levels from attacking each other while also obviating the need for a mandatory access control mechanism to provide separation.

As will be appreciated by one of ordinary skill in the art, most commercial operating systems, which can be used as the host operating system in the method of the present invention, natively support process isolation. The host operating system prevents processes from accessing one another's memory space by running each process in its own virtual memory space. The host operating system may also have a security reference monitor in the kernel that controls access to objects in the system. In such an arrangement each process can have attached to it an access token that contains the security identifier of the user that the process is running as, in addition to the security identifiers of any groups the user is a member of.

In the case of the present invention, a separate virtual machine host process can be created for each network or security level the machine will be operating at. Each one of these virtual machine processes can run as a different local user account on the host operating system and thus can have a different access token associated with it.

As will be appreciated by one of ordinary skill in the art, many commercial operating systems also natively support discretionary access control lists. In such systems, named objects in the operating system have a security descriptor that contains a discretionary access control list. This discretionary access control list is a list of user and group security identifiers and the permissions on the object that they are either allowed or denied. Only the object owner and those with the proper permissions to the object can change the discretionary access control list.

When a process attempts to access an object, in the Microsoft Windows® operating system by Microsoft of Redmond, Wash., for example, it can specify the access level it would like and the security reference monitor can then use the security identifiers in the process' access token to walk the discretionary access control list until either the requested permissions are accumulated, a deny for a requested permission is found, or the end of the list is reached. In the first case a handle can be returned for the object to the process and in the other cases an error can instead be returned.

Figure 4:
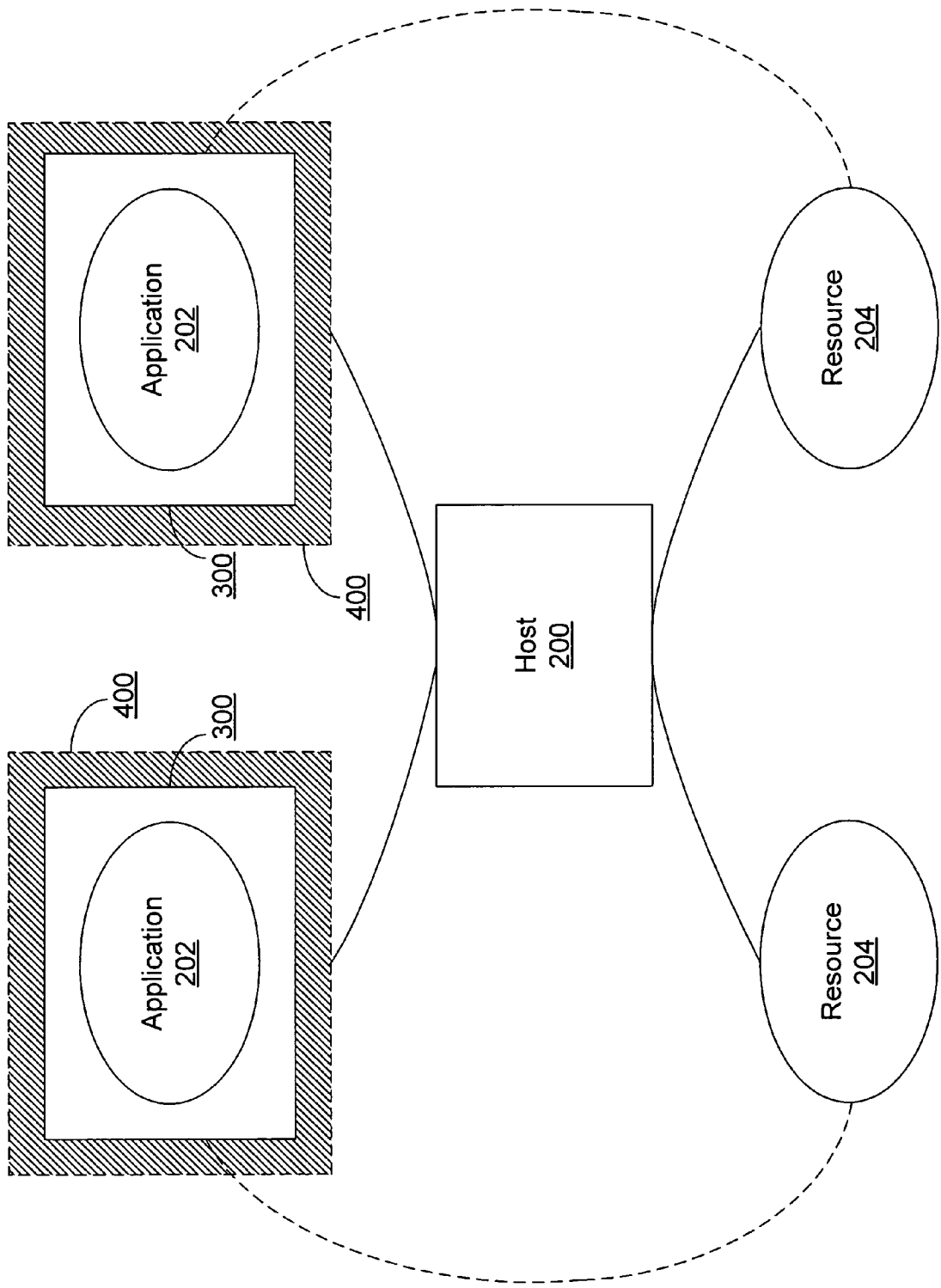
FIG. 4 is a schematic diagram showing an operating system architecture employing virtual machine technology wherein the virtual machines are at different classifications through the use of local security mechanisms.
Figure 5:
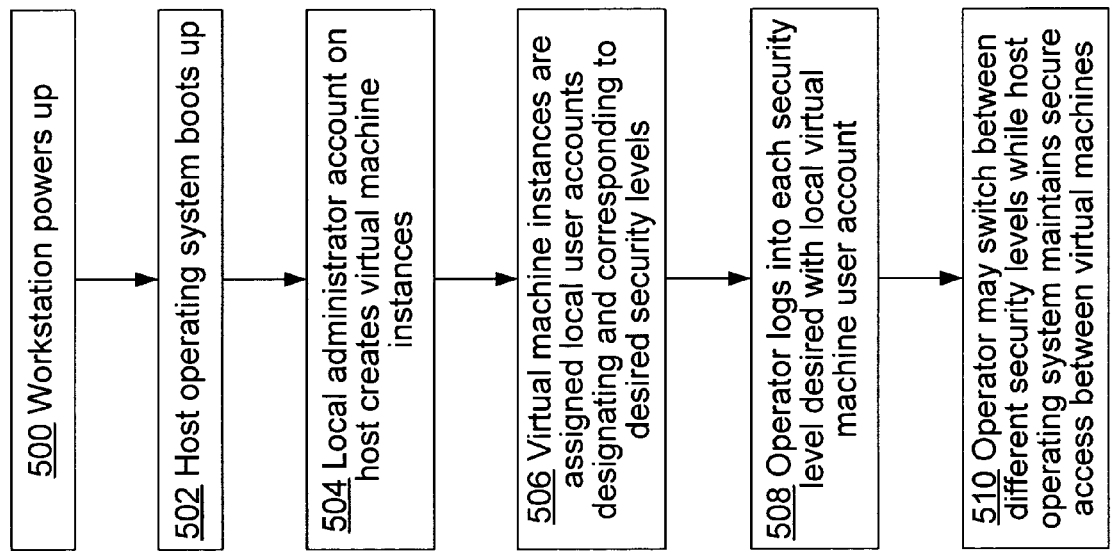
FIG. 5 is a flowchart illustrating the method for providing secure access to multiple secure networks from a single workstation.

Each virtual machine can store its data and configuration as a series of large files on the host hard disk. One concern with using virtual machines to provide isolation is that malicious code might be able to find a flaw in the virtual machine and escape its isolation. This malicious code could then attempt to directly access the virtual disk file for a virtual machine operating at a different level. Since the host operating system instantiates each virtual machine as a separate user with a different access token the virtual machine disk files can also have discretionary access control lists placed on them to prevent access from the other virtual machine security contexts. FIG. 4 illustrates such an arrangement.

For example, with reference to FIG. 4, a need may exist for two security levels, "Low" and "High". In this case there would also be two local user accounts 400 on the host 200 also named "Low" and "High". The virtual machine 300 that will access the "High" network will run as the "High" user account 400 and its disk resources 204 will have a discretionary access control list that only allows the "High" user account 400 access, thereby preventing access to both its memory as well as its disk resources from the "Low" user account 400. The same will be done for the "Low" virtual machine 300 and its resources 204. As will be appreciated by one of ordinary skill in the art, the net effect of this use of multiple host user accounts and access control lists is the same as the use of a mandatory access control but without the overhead associated with mandatory access control mechanisms or the creation and management of additional mandatory access control policies.

In one embodiment of the present invention, the local host user accounts can be created with blank passwords to make it easy for the workstation operator to switch between levels as well as to prevent programmatic access to different levels from the same desktop. While any operator at the console can switch between levels, he or she would still need to be able to log in to the virtual machine itself to access any resources.

In another embodiment a biometric device can be employed to make the switching between levels faster and easier. For example, with a fingerprint reader system the operator can train different fingers to represent different levels on the system. When the operator would like to change levels he or she would just need to place the appropriate finger on the reader. The biometric solution will automatically validate the fingerprint, select the appropriate level account, and switch to that desktop.

Many commercial operating systems also include the ability to encrypt files and directories on the system such that only certain users have the ability to decrypt and access their contents—even if the disk is attacked offline or a malicious user boots an alternate operating system. In such an operating system each designated file is typically encrypted with a unique key. Multiple copies of this key are then stored with the file, each encrypted with an allowed user's public key. Decryption is performed by locating the user's private key, decrypting the unique key and then decrypting the file. Once the file is flagged as encrypted the entire encrypt/decrypt operating is done by the operating system invisibly to the user and applications. The user's private key is stored in the user's profile on the hard disk and is encrypted with a key derived from the account's logon credentials. In the case of the present invention, the encrypting file system can be used to encrypt each virtual machine's virtual disk files so that only the designated local user accounts (e.g., "Low" or "High") can decrypt and access them. This provides an additional layer of defense to the aforementioned discretionary access control list mechanism.

IV. Secure and Restricted Host Operating System

An additional level of security can be achieved through the use of a highly secured and restricted host operating system. In the case of the present invention, the host operating system needs only to run the virtual machine software, to provide basic services, and to maintain isolation. Therefore the host operating system can be configured to run a bare set of services thereby reducing its overall attack surface.

One of the concerns with using a single host to connect to multiple security domains is that an attacker on one of the networks will be able to attack the host directly and defeat the isolation mechanisms it provides between the networks. In the case of the present invention, the host operating system has no network services above the network card interface layer except for the virtual machine monitor bridge protocol used to bind the virtual machine to the physical network adaptor.

In one embodiment of the present invention, all networking services on the host operating system can be uninstalled including completely unbounding the TCP/IP protocol stack from each host network adaptor. All TCP/IP and other higher level networking tasks are handled directly by the guest operating system in the virtual machine and the host operating system cannot be accessed directly on the network using any services above the basic data link layer (i.e., the host still does have a MAC address and understands basic protocols such as transmitting and receiving ethernet packets).

In another embodiment, only those services that are necessary for host machine operation can be allowed to start and all others can be disabled or removed. For instance, while a standard Microsoft Windows® XP Professional machine has over 40 Windows® system services started, in the case of the present invention the number can be been reduced significantly to only: COM+ Event System, Event Log, Fast User Switching Compatibility, Plug and Play, Protected Storage, Remote Procedure Call (RPC), Security Accounts Manager, Terminal Services. In addition, all optional host operating system applications and components can be uninstalled or removed to further reduce the attack surface.

It may also be desirable that the architecture of the present invention prevents operators of the system from configuring, either maliciously or accidentally, the host operating system in a way that could break the separation between security domains. To minimize this risk, interfaces that would allow operators access to the file system of the workstation can simply be replaced on the host system with the virtual machine monitor as the user interface shell. The operator is then not provided the opportunity to easily invoke other programs on the host that could compromise its security.

The host operating system may also provide software restriction policies, a feature that allows an administrator to restrict which programs are allowed by the operating system to be loaded and run. For example, in the Microsoft Windows® operating system by Microsoft of Redmond, Wash., this decision to load a given binary is not based in any application logic but rather can be hooked directly into the operating system CreateProcess and LoadDLL functions used by all applications on the system. Software restriction policy may have two possible default modes, disallowed and unrestricted, and the architecture of the present invention can set the default mode to disallowed. This mode means that the operating system will not allow users to load any executables unless it is explicitly permitted by policy. Programs explicitly allowed to run can be identified to the system by a cryptographic hash of their binary image to thwart attempts to run them by simply renaming the files. Thus, to add increased security, in one embodiment the only binaries that users are allowed to load are the virtual machine monitor application, the binaries needed to logon and access the logon desktop, and the logoff application.

V. Read-Only Storage of Operating System and Virtual Machine Monitor

A final gain in security can be realized in the ability to boot the system from read-only media. The method of the present invention provides the following methods for booting the host operating system and virtual machine monitor. In all cases the virtual machine disk files stay on the hard disk in encrypted files, as they are too large to store on typical removable media.

An initial configuration for the method of the present invention can be to boot from the hard disk where the operating system and virtual machine monitor are stored in their own partition separate from the virtual machine monitor data. A file protection facility can then be applied on the operating system/virtual machine monitor partition to prevent any attempts to write to it from persisting to disk. In one embodiment the facility may work by intercepting any attempts to write to the hard disk and redirecting these writes off to memory. To the application that attempted the write the operation appears to have succeeded, but when the system is shut down all changes are flushed from memory and not committed to disk. Hard drive boot offers good system performance with lower memory usage. In order to update the operating system/virtual machine monitor image a new image must first be created. Then a bootable CD can be made that upon a single boot copies the files from the CD to the hard disk. A lightweight operating system such as Microsoft Windows® XP Embedded by Microsoft of Redmond, Wash. may be useful in such a scenario as it may be deployed and updated with a simple file copy operation.

The method of the present invention can also be deployed such that the operating system and virtual machine monitor are booted directly from a CDROM and access the virtual machine files on the hard disk. This configuration offers the benefit of booting from truly read-only media, but system performance is very slow until the operating system and virtual machine monitor are cached in RAM. In addition, the CDROM drive must remain locked and inaccessible to applications while the system is running. Maintenance for CDROM boot systems is also very simple because the administrators simply need to hand out new CDs for the users boot from and dispose of the old ones. The CDs need not be unique per machine. In addition, CDROM boot configurations allow the users to easily secure the CDs when not physically present at the machine. When the host operating system on the CD is physically secured the only storage remaining on the system is encrypted virtual machine data as described earlier. An alternative embodiment for CDROM boot is to boot a CD that copies its entire image to a RAM drive and then boot the system from the RAM drive. After the initial copy system performance is very fast and the CD can be removed from the drive and secured if desired.

For installations that possess the network infrastructure the host operating system and virtual machine monitor can also be booted from a server. In this configuration the host operating system and virtual machine monitor are copied to a RAM drive at boot time from a server on the network. Once this initial copy has occurred the system can continue to function even if the network fails so long as the system is not rebooted. If the host operating system or virtual machine monitor needs to be updated the server based configuration can be updated centrally. Like the other RAM drive boot configurations this option may require more memory on the system but is very high performance after initial boot.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for providing secure access to a plurality of secure networks from a single computing device, the method comprising:
   running on the computing device a virtual machine monitor, wherein the virtual machine isolates a plurality of commercial desktop operating systems, the desktop operating systems running within separate virtual machines on a host operating system, the host operating system comprising a commercial operating system;
   binding a physical network adaptor on the host to a virtual adaptor assigned to each virtual machine, wherein the physical network adaptor is connected to one of the secure networks: and
   assigning user security contexts on the host operating system to the virtual machines, wherein the user security contexts isolate the virtual machines as separate users on the host operating system through the use of discretionary access control lists.

2. The method of claim 1 further creating a data storage facility corresponding to each virtual machine.

3. The method of claim 2 wherein each data storage facility is encrypted with a key derived from the user security context's logon credentials.

4. The method of claim 1 wherein the user security contexts assigned to the virtual machines are created with blank passwords.

5. The method of claim 1 further comprising training the host to associate each virtual machine with input received from a biometric device.

6. The method of claim 1 wherein all network services on the host above network interface level are disabled.

7. The method of claim 1 wherein any optional host operating system services are disabled.

8. The method of claim 1 wherein any optional host operating system applications are disabled.

9. The method of claim 1 wherein any optional host operating system components are disabled.

10. The method of claim 1 wherein any host operating system file system interfaces are replaced with the virtual machine monitor as the interface shell.

11. The method of claim 1 wherein the host operating system provides for software restriction policies, such that binaries which are explicitly allowed, by the host operating system, to be run by the virtual machines are identified by a cryptographic hash of the binary's image.

12. The method of claim 1 wherein the host operating system and virtual machine monitor boot files are stored on read-only media.

13. A computer-readable storage medium having computer-executable instructions for performing a method for providing secure access to a plurality of secure networks from a single computing device, the method comprising:
  running on the computing device a virtual machine monitor, wherein the virtual machine monitor isolates a plurality of commercial desktop operating systems, the desktop operating systems running within separate virtual machines on a host operating system, the host operating system comprising a commercial operating system;
  binding a physical network adaptor on the host to a virtual adaptor assigned to each virtual machine, wherein the physical network adaptor is connected to one of the secure networks; and
  assigning user security contexts on the host operating system to the virtual machines, wherein the user security contexts isolate the virtual machines as separate users on the host operating system through the user of discretionary access control lists.

14. The computer-readable storage medium of claim 13 having further computer-executable instructions for performing the step of creating a data storage facility corresponding to each virtual machine.

15. The computer-readable storage medium of claim 14 wherein each data storage facility is encrypted with a key derived from the user security context's logon credentials.

16. The computer-readable storage medium of claim 13 wherein the user security contexts assigned to the virtual machines are created with blank passwords.

17. The computer-readable storage medium of claim 13 having further computer-executable instructions for performing the step of training the host to associate each virtual machine with input received from a biometric device.

18. The computer-readable storage medium of claim 13 wherein all network services on the host above network interface level are disabled.

19. The computer-readable storage medium of claim 13 wherein any optional host operating system services are disabled.

20. The computer-readable storage medium of claim 13 wherein any optional host operating system applications are disabled.

21. The computer-readable storage medium of claim 13 wherein any optional host operating system components are disabled.

22. The computer-readable storage medium of claim 13 wherein any host operating system file system interfaces are replaced with the virtual machine monitor as the interface shell.

23. The computer-readable storage medium of claim 13 wherein the host operating system provides for software restrictions policies, such that binaries which are explicitly allowed, by the host operating system, to be run by the virtual machines are identified by a cryptographic hash of the binary's image.

24. The computer-readable storage medium of claim 13 wherein the host operating system and virtual machine monitor boot files are stored on read-only media.

25. A system for providing secure access to a plurality of secure networks from a single computing device, the system comprising:
  a virtual machine monitor running on the computing device, wherein the virtual machine monitoring isolates a plurality of commercial desktop operating systems, the desktop operating systems running within separate virtual machines on a host operating system, the host operating system comprising a commercial operating system;
  a physical network adaptor on the host bound to a virtual adaptor assigned to each virtual machine, wherein the physical network adaptor is connected to one of the secure networks; and
  user security contexts on the host operating system assigned to the virtual machines, wherein the user security context isolate the virtual machines as separate users on the host operating system through the use of discretionary access control lists.

26. The system of claim 25 further comprising a data storage facility corresponding to each virtual machine.

27. The system of claim 26 wherein each data storage facility is encrypted with a key derived from the user security context's logon credentials.

28. The system of claim 25 wherein the user security contexts assigned to the virtual machines are created with blank passwords.

29. The system of claim 25 further comprising a biometric device, wherein the biometric device provides, to the host, input associated with each virtual machine.

30. The system of claim 25 wherein all network services on the host above network interface level are disabled.

31. The system of claim 25 wherein any optional host operating system services are disabled.

32. The system of claim 25 wherein any optional host operating system applications are disabled.

33. The system of claim 25 wherein any optional host operating systems components are disabled.

34. The system of claim 25 wherein any host operating system file system interfaces are replaced with the virtual machine monitor as the interface shell.

35. The system of claim 25 wherein the host operating system provides for software restriction policies, such that binaries which are explicitly allowed, by the host operating system, to be run by the virtual machines are identified by a cryptographic hash of the binary's image.

36. The system of claim 25 wherein the host operating system and virtual machine monitor boot files are stored on read-only media.

* * * * *